(12) United States Patent
Gupta et al.

(10) Patent No.: US 11,392,537 B2
(45) Date of Patent: Jul. 19, 2022

(54) REACH-BASED EXPLICIT DATAFLOW PROCESSORS, AND RELATED COMPUTER-READABLE MEDIA AND METHODS

(71) Applicant: Microsoft Technology Licensing, LLC, Redmond, WA (US)

(72) Inventors: Gagan Gupta, Redmond, WA (US); Michael Scott McIlvaine, Raleigh, NC (US); Rodney Wayne Smith, Raleigh, NC (US); Thomas Philip Speier, Wake Forest, NC (US); David Tennyson Harper, III, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 16/356,875

(22) Filed: Mar. 18, 2019

(65) Prior Publication Data
US 2020/0301877 A1    Sep. 24, 2020

(51) Int. Cl.
*G06F 15/82*    (2006.01)
*G06F 9/44*    (2018.01)
(Continued)

(52) U.S. Cl.
CPC ........ *G06F 15/825* (2013.01); *G06F 9/30058* (2013.01); *G06F 9/3836* (2013.01); *G06F 9/4494* (2018.02)

(58) Field of Classification Search
CPC .... G06F 9/3828; G06F 9/3836; G06F 9/3838; G06F 9/3824; G06F 9/4494; G06F 9/30058; G06F 15/825
See application file for complete search history.

(56) References Cited

U.S. PATENT DOCUMENTS 5,941,983 A  *  8/1999  Gupta ................... G06F 9/3836
                                                            712/214
5,974,538 A  *  10/1999 Wilmot, II .......... G06F 9/30069
                                                            712/217
(Continued)

OTHER PUBLICATIONS

H. Irie et al., "STRAIGHT: Hazardless Processor Architecture Without Register Renaming," 2018 51st Annual IEEE/ACM International Symposium on Microarchitecture (MICRO), Fukuoka, pp. 121-133 (Year: 2018).*

(Continued)

*Primary Examiner* — Jyoti Mehta
*Assistant Examiner* — Kasim Alli
(74) *Attorney, Agent, or Firm* — Withrow & Terranova, PLLC

(57) ABSTRACT

Exemplary reach-based explicit dataflow processors and related computer-readable media and methods. The reach-based explicit dataflow processors are configured to support execution of producer instructions encoded with explicit naming of consumer instructions intended to consume the values produced by the producer instructions. The reach-based explicit dataflow processors are configured to make available produced values as inputs to explicitly named consumer instructions as a result of processing producer instructions. The reach-based explicit dataflow processors support execution of a producer instruction that explicitly names a consumer instruction based on using the producer instruction as a relative reference point from the producer instruction. This reach-based explicit naming architecture does not require instructions to be grouped in instruction blocks to support a fixed block reference point for explicit naming of consumer instructions, and thus is not limited to explicit naming of consumer instructions only within the same instruction block of the producer instruction.

3 Claims, 10 Drawing Sheets

(51) Int. Cl.
*G06F 9/30* (2018.01)
*G06F 9/38* (2018.01)
*G06F 9/448* (2018.01)

(56) References Cited

U.S. PATENT DOCUMENTS

| | | | | |
|---|---|---|---|---|
| 6,009,512 | A * | 12/1999 | Christie | G06F 9/30072 |
| | | | | 712/218 |
| 6,219,781 | B1 * | 4/2001 | Arora | G06F 9/3838 |
| | | | | 712/217 |
| 6,981,130 | B2 * | 12/2005 | Gupte | G06F 9/3828 |
| | | | | 712/216 |
| 7,836,289 | B2 * | 11/2010 | Tani | G06F 9/30072 |
| | | | | 712/234 |
| 9,971,600 | B2 * | 5/2018 | Brownscheidle | G06F 9/3838 |
| 2010/0250900 | A1 * | 9/2010 | Brown | G06F 9/3814 |
| | | | | 712/208 |
| 2018/0032335 | A1 | 2/2018 | Smith et al. | |

OTHER PUBLICATIONS

Burger, et al., "Scaling to the End of Silicon with EDGE Architectures," In Journal of Computers, vol. 37, Issue 7, Jul. 12, 2004, pp. 44-55.

Nagarajan, et al., "A Design Space Evaluation of Grid Processor Architectures", In Proceedings of 34th ACM/IEEE International Symposium on Microarchitecture, Dec. 1, 2001, pp. 40-51.

International Search Report and Written Opinion Issued in PCT Application No. PCT/US20/021617, dated Jun. 17, 2020, 14 Pages.

* cited by examiner

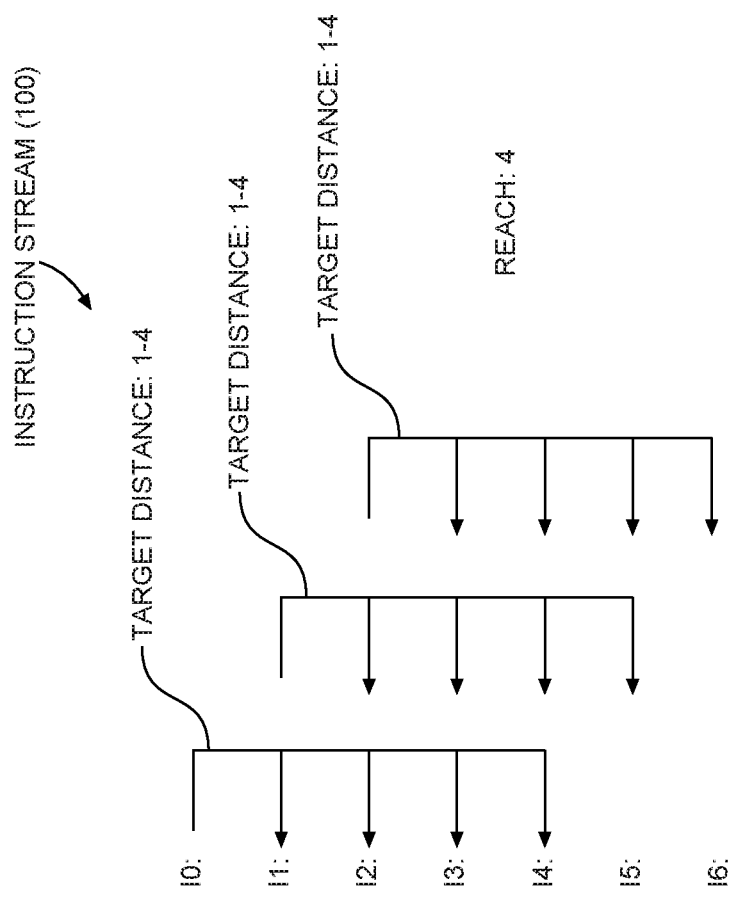

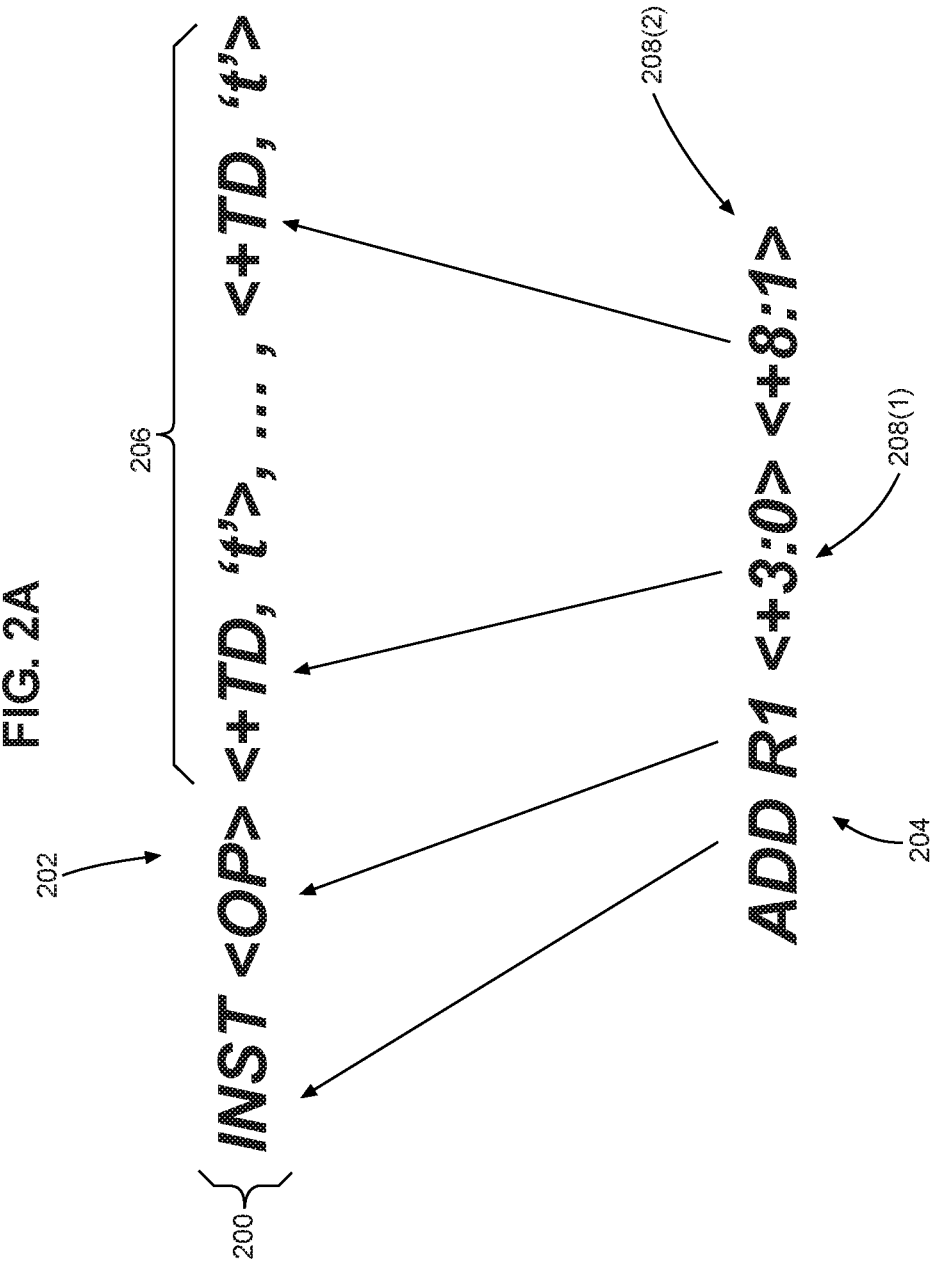

600

```
I0:  READ R0 <+3:0>, <+4:1>              // I3, I4
I1:  READ R1 <+2:1>, <+3:0>              // I3, I4
I2:  READ R2 <+4:0>                      // I6 – COMPARED AGAINST 0 FOR THE CONDITIONAL BRANCH
I3:  ADD <+2:0>, <+4:1>                  // I5, I9 (FOR I6 TAKEN PATH ONLY)
I4:  MUL <+1:1>, <+4:0>                  // I5, I10 (FOR I6 TAKEN PATH ONLY)
I5:  SUB <+2:0>                          // I7 (FOR I6 NOT TAKEN PATH ONLY)
I6:  TEQZ.B <I9>                         // CONDITIONALLY BRANCH AROUND HALT
I7:  STORE #100                          // STORE RESULT OF I5
I8:  HALT                                // HALT EXECUTION
I9:  ADDI #3, <+2:0>                     // ADD 3 TO RESULT OF I3- BUT COULD BE I5 FOR BRANCH TAKEN IN I6
I10: DIVI #5, <+1:1>                     // DIVIDE RESULT OF I4 BY 5
I11: ADD <+1:0>
```

I0: READ R0 <+3:0>, <+4:1>
I1: READ R1 <+2:1>, <+3:0>
I2: READ R2 <+3:0>
I3: ADD <+2:0>, <+5:1>     // 2ND TARGET CHANGES BECAUSE AN ADDITIONAL INSTRUCTION WAS INSERTED
I4: MUL <+1:1>, <+5:1>     // SIMILAR CHANGE TO 2ND TARGET
I5: TNEZ <+1:p>, <+2:0>    // TEST ONLY, NO BRANCH; USED AS PREDICATE AND AS CONDITION
I6: SUB.T <+2:0>           // SUB ONLY PRODUCES A VALUE WHEN I5 TEST IS TRUE (WHEN I7 IS NOT TAKEN)
I7: TEQZ.B <I10>           // SAME CONDITIONAL BRANCH – TESTING RESULT OF I5 TEST
I8: STORE #100
I9: HALT
I10: ADDI #3, <+2:0>
I11: DIVI #5, <+1:1>
I12: ADD <+1:0>

FIG. 6B

```
...
I0: READ R0 <+2:0>
I1: READ R1 <+1:1>                                                        // I2
I2: ADD <+3:0>                                                            // I2
I3: READ R2 <+1:0>                                                        // I5, BUT DON'T INFLUENCE FAR AWAY CODE
I4: TEQZ.B <INVALIDATE-ON-TAKEN> <A_FAR_AWAY_LABEL>                       // I4
I5: ABS <+1:0>                                                            // INVALIDATE EXPLICIT COMM FOR FAR AWAY
...
```

REACH-BASED EXPLICIT DATAFLOW PROCESSORS, AND RELATED COMPUTER-READABLE MEDIA AND METHODS

FIELD OF THE DISCLOSURE

The technology of the disclosure relates to execution of instructions by a central processing unit (CPU) processor, and more particularly to CPU processors supporting explicit dataflow communications of produced values from a producer instruction to a dependent consumer instruction(s).

BACKGROUND

Microprocessors, also known as "processors," perform computational tasks for a wide variety of applications. A conventional microprocessor includes a central processing unit (CPU) that includes one or more processor cores, also known as "CPU cores," that execute software instructions. The software instructions instruct a CPU to perform operations based on data. The CPU performs an operation according to the instructions to generate a result, which is a produced value. The produced value may then be provided as an output to an I/O device, or made available (i.e., communicated) as an input value to another consumer instruction executed by the CPU. Thus, the consumer instruction is dependent on the produced value produced by the "producer" instruction as an input value to the consumer instruction for execution. These producer and consumer instructions are also referred to collectively as "dependent instructions."

Traditionally, communication between dependent instructions has been done implicitly using the general purpose register (GPR) namespace as a rendezvous point. This communication is termed "implicit," because the producer instruction that produces (i.e., writes) a value into a GPR has no knowledge of which consumer instruction(s) will consume (i.e., read) that produced value. This method of communication can have limitations. As one limitation, the GPR namespace has a finite size, because the names of the consumer instructions are encoded into a finite length instruction. Also, the number of GPRs is generally smaller than the number of values produced by a computation such that multiple produced values must be communicated using the same name of the producer instruction—that is, aliasing occurs within a set of producer instructions and within a set of consumer instructions. Further, because producer instructions have no reference to the consumer instructions for its produced value, there is not a direct way to notify the consumer instruction that the value it will consume has been produced. These concerns have been solved in different ways in modern CPU implementations, but at various costs and tradeoffs associated with the solutions.

An alternative method of communicating between dependent instructions is to explicitly name the consumer instruction that consumes the produced value in the producer instruction. This is referred to as "explicit" communication. CPUs built on an explicit communication model have been referred to as explicit dataflow graph execution (EDGE) CPUs. Explicit communications addresses the notification issue of produced values to consumer instructions related to implicit communications. Because the producer instruction directly encodes the name of the consumer instruction in an explicit communications model, it is simple for the consumer to be notified when the producer instruction generates its produced value to provide the consumer instruction's input value. One issue that may still be present in explicit communications is the size allocated to encoding a consumer name in a producer instruction. The number of bits allocated to encoding a consumer name in a producer instruction must be sufficient to name the possible consumer instructions desired based on the design. Providing an instruction format that allows a larger bit encoding size of a consumer instruction name provides greater flexibility in explicit naming of consumer instructions, but also consumes a larger amount of memory space for storage of instructions. Conventional EDGE processors have addressed the size of an instruction name by partitioning the dataflow graph of the full computation into pieces, sometimes referred to as instruction blocks, with explicit consumer naming being based on the start of the instruction block. The EDGE processors are designed to employ an execution model that explicitly communicates produced values to consumer instructions within the same block-local namespace so that the maximum number of instructions in a block is determined and limited by the size of the name that can be encoded in an instruction.

Thus, while an EDGE processor has the advantage of reduced complexity relative to an implicit communication model, an EDGE processor has a disadvantage of being limited in explicit communication of produced values to consumer instructions in the same instruction block. Further, since consumer names are only valid within a given instruction block, there is an issue with communicating produced values internal to an instruction block across block boundaries. Previous EDGE CPUs use implicit communication (either via the memory namespace or the GPR namespace) to communicate produced values externally across instruction block boundaries. Although inter-block communication is less frequent than intra-block communication for reasonable block sizes, the use of implicit communication dilutes the advantages of explicit communications for dependent instructions. Constraining instruction blocks to have a maximum size also places a burden on the programmer or compiler, which must decide which instructions are best placed in each instruction block based on communication patterns between dependent instructions and the associated costs.

SUMMARY

Exemplary aspects disclosed herein include reach-based explicit dataflow processors, and related computer-readable media and methods. The reach-based explicit dataflow processors are configured to support execution of producer instructions encoded with explicit naming of consumer instructions intended to consume the values produced by the producer instructions. The reach-based explicit dataflow processors are configured to provide or otherwise make available the produced values as inputs to the explicitly named consumer instructions as a result of processing the encoded producer instructions. In exemplary aspects disclosed herein, the reach-based explicit dataflow processors support execution of a producer instruction that explicitly names a consumer instruction based on using the producer instruction as a reference point and naming the consumer instruction relative to that reference point. The name assigned by the producer instruction to the consumer instruction is referred to as the target distance. The maximum target distance allowed by the reach-based explicit dataflow processor is referred to as a "reach" of the processor. The reach of the processor defines the maximum set of consumer instructions that can be explicitly named by a producer instruction. In this manner, as an example, this reach-based explicit naming does not require instructions to be grouped in instruction blocks to support a fixed block reference point for explicit naming of consumer instructions, and thus be limited to explicit naming of consumer instructions only within the instruction block of the producer instruction. Thus, removing the architectural limitation of instruction blocks in a dataflow processor can allow the dataflow processor to be designed to support explicit data flow communications over larger computation graphs that are not limited by instruction block size. Reach-based explicit consumer naming may also have the advantage of requiring less consumer encoding namespace ("reach namespace") since consumer naming is relative to the location of the producer instruction rather than a fixed reference location that may be more frequently farther away from the consumer instruction.

In other exemplary aspects disclosed herein, the target distance of the consumer instruction named by a producer instruction is encoded in a reach namespace of a producer instruction as a target distance value. The bit size chosen for the reach namespace defines maximum target distance, or reach, of the set of consumer instructions that a producer instruction can explicitly communicate with directly. The bit size of the reach namespace for a specific implementation is a design decision determined by the desired tradeoff between the instruction memory size needed to store a given number of instructions and the reach namespace desired. The reach-based explicit dataflow processor can also support use of an intermediate consumer instruction(s) named by a producer instruction for indirect naming of a consumer instruction if the consumer instruction is beyond the reach of the producer instruction. In this regard, the intermediate consumer instruction(s) can name another consumer instruction(s) that can name the ultimate intended consumer instruction to provide the produced value to the ultimate intended consumer instruction. Further, the reach-based explicit producer/consumer communications do not preclude the ability of the reach-based explicit dataflow processor to support implicit producer/consumer communications if the target distance is larger than the reach value and, for example, a programmer or compiler does not deem it desired to use intermediate consumer instructions.

In this regard, in one exemplary aspect, a processor is provided. The processor is configured to receive a plurality of instructions in an instruction stream from an instruction memory to be executed, the plurality of instructions comprising a plurality of producer instructions and a plurality of consumer instructions. The processor is also configured to dispatch a consumer instruction among the plurality of consumer instructions to be executed in response to at least one operand of the consumer instruction being available. The processor is also configured to execute a producer instruction among the plurality of producer instructions to generate a produced value, the producer instruction configured to include at least one explicit consumer name each comprising a consumer target distance value representing a relative instruction distance in the instruction stream from the producer instruction and an associated consumer operand value. The processor is also configured to determine if the executed producer instruction includes an explicit consumer name. In response to determining the executed producer instruction includes an explicit consumer name, the processor is also configured to write the produced value of the executed producer instruction to the at least one operand of the consumer instruction identified as being located a distance away from the producer instruction in the instruction stream by the consumer target distance value of the executed producer instruction.

In another exemplary aspect, a method of providing a produced value from a producer instruction executed by a processor as an input to a consumer instruction based on an explicit naming of the consumer instruction is provided. The method comprises receiving a plurality of instructions in an instruction stream from an instruction memory to be executed, the plurality of instructions comprising a plurality of producer instructions and a plurality of consumer instructions. The method also comprises executing a producer instruction among the plurality of producer instructions to generate a produced value, the producer instruction configured to include at least one explicit consumer name each comprising a consumer target distance value representing a relative instruction distance in the instruction stream from the producer instruction and an associated consumer operand value. The method also comprises determining if the executed producer instruction includes an explicit consumer name. In response to determining the executed producer instruction includes an explicit consumer name, the method also comprises storing the produced value of the executed producer instruction to at least one operand of the consumer instruction identified as being located a distance away from the producer instruction in the instruction stream by the consumer target distance value of the executed producer instruction. The method also comprises dispatching a consumer instruction among the plurality of consumer instructions to be executed in response to the at least one operand of the consumer instruction being stored.

In another exemplary aspect, a non-transitory computer-readable medium having stored thereon an instruction program comprising a plurality of computer executable instructions for execution by a processor is provided. The plurality of computer executable instructions comprises a producer instruction comprising an instruction type and an explicit consumer name comprising a consumer target distance value representing a relative instruction distance in an instruction stream from the producer instruction and an associated consumer operand value. The plurality of computer executable instructions comprises a consumer instruction comprising an instruction type and an operand, the consumer instruction located an instruction distance away from the producer instruction in the instruction program by the consumer target distance value of the producer instruction, and the associated consumer operand value of the producer instruction mapped to the operand of the consumer instruction.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is an exemplary list of computer instructions to illustrate possibilities of a reach-based explicit dataflow processor supporting reach-based explicit consumer naming of a consumer instruction(s) in a producer instruction based on reach of four (4);

FIG. 2A illustrates an exemplary producer instruction coded with an instruction data format that includes reach-based explicit consumer namespace for encoding one or more reach-based explicit consumer instructions identified to consume the value produced by the producer instruction;

FIG. 2B illustrates an exemplary instruction data format for the producer instruction in FIG. 2A;

FIG. 6A is an exemplary instruction stream of computer instructions encoded with reach-based explicit consumer naming and configured to be processed by a reach-based explicit dataflow processor, wherein the instruction listing includes a WAW hazard due to a branch instruction and that does not include an intermediate WAW instruction to resolve the WAW hazard;

FIG. 6B is an exemplary instruction stream of computer instructions in FIG. 6A, wherein the instruction stream resolves the WAW hazard by predicating an instruction creating the WAW hazard based on a branch not being taken;

Figure 4:
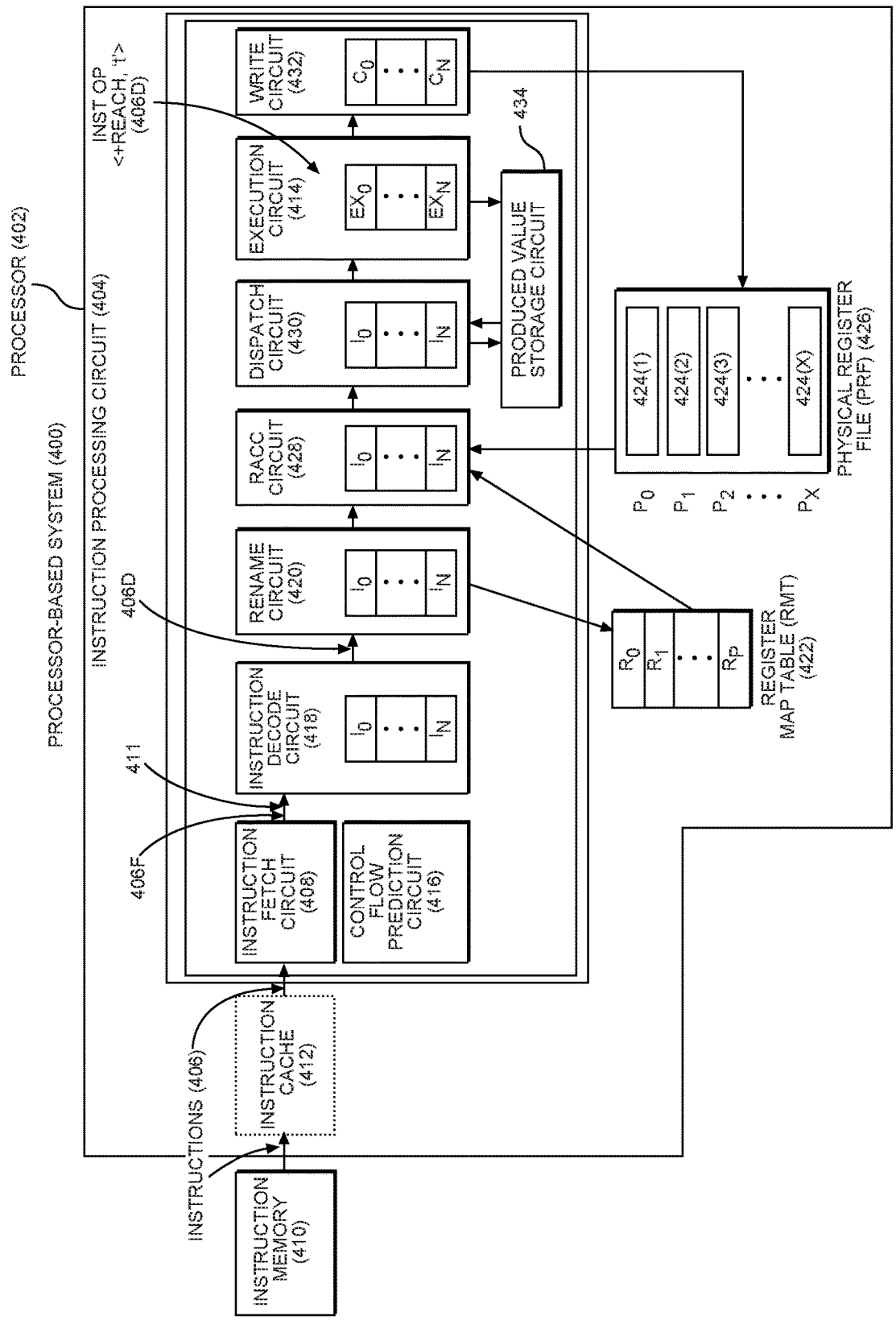
FIG. 4 is a schematic diagram of an exemplary processor-based system that includes a reach-based dataflow processor configured to support execution of producer instructions encoded with reach-based explicit consumer naming, to provide produced values from the executed producer instructions for consumption by consumer instructions identified by reach-based explicit consumer naming.
Figure 7:
Figure 8:
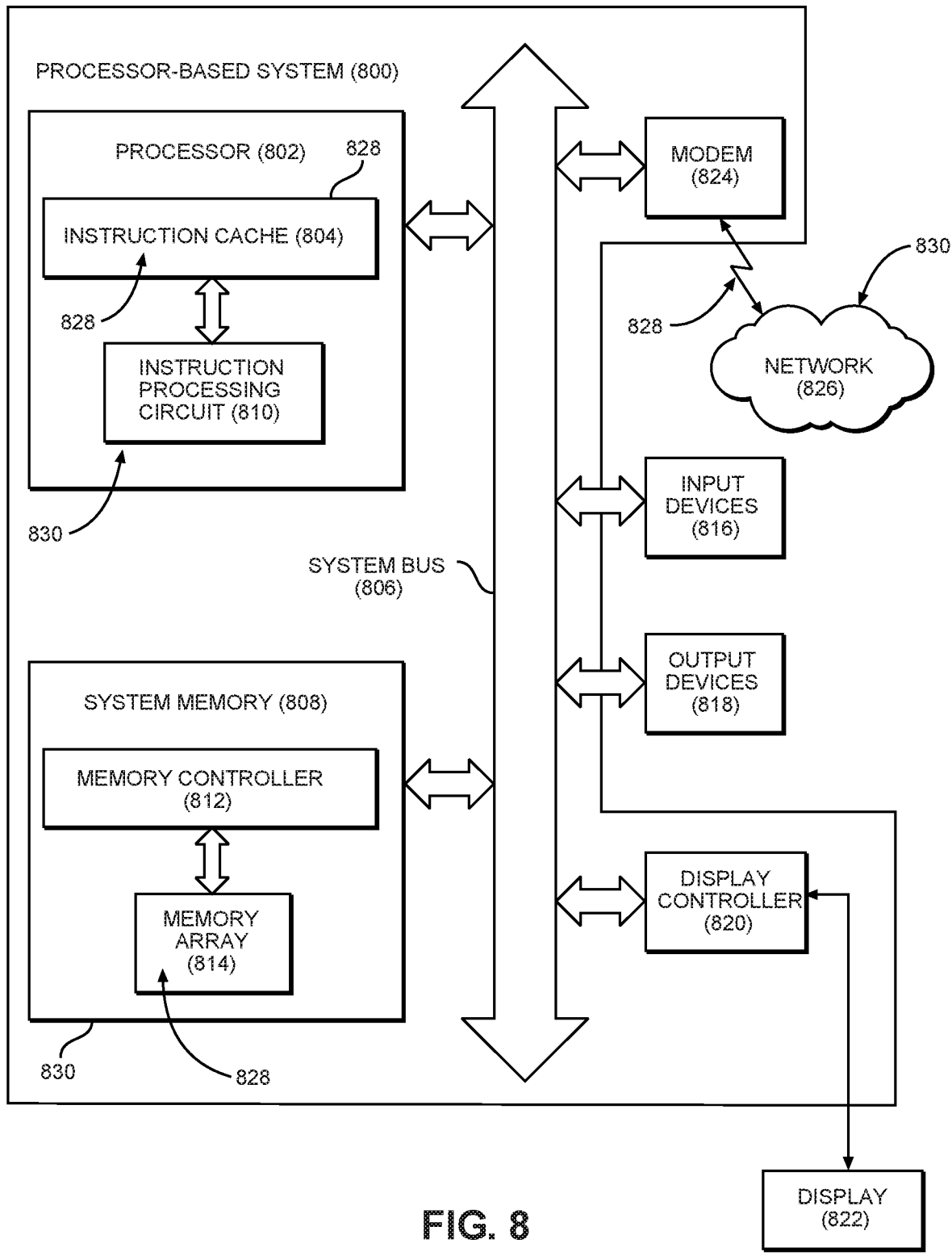

FIG. 7 is an exemplary instruction stream of computer instructions encoded with reach-based explicit consumer/ naming and configured to be processed by a reach-based explicit dataflow processor, wherein the instruction listing includes a branch instruction that is encoded to cause a reach-based explicit dataflow processor to invalidate a produced value when a branch is taken to resolve a WAW hazard; and FIG. 8 is a block diagram of an exemplary processor-based system that includes a reach-based explicit dataflow processor, including but not limited to the reach-based dataflow processor in FIG. 4, and configured to support execution of producer instructions encoded with reach-based explicit naming of consumer instructions intended to consume the values produced by the producer instructions.

DETAILED DESCRIPTION

Exemplary aspects disclosed herein include reach-based explicit dataflow processors, and related computer-readable media and methods. The reach-based explicit dataflow processors are configured to support execution of producer instructions encoded with explicit naming of consumer instructions intended to consume the values produced by the producer instructions. The reach-based explicit dataflow processors are configured to provide or otherwise make available the produced values as inputs to the explicitly named consumer instructions as a result of processing the encoded producer instructions. In exemplary aspects disclosed herein, the reach-based explicit dataflow processors support execution of a producer instruction that explicitly names a consumer instruction based on using the producer instruction as a reference point and naming the consumer instruction relative to that reference point. The name assigned by the producer instruction to the consumer instruction is referred to as the target distance. The maximum target distance allowed by the reach-based explicit dataflow processor is referred to as a "reach" of the processor. The reach of the processor defines the maximum set of consumer instructions that can be explicitly named by a producer instruction. In this manner, as an example, this reach-based explicit naming does not require instructions to be grouped in instruction blocks to support a fixed block reference point for explicit naming of consumer instructions, and thus be limited to explicit naming of consumer instructions only within the instruction block of the producer instruction. Thus, removing the architectural limitation of instruction blocks in a dataflow processor can allow the dataflow processor to be designed to support explicit data flow communications over larger computation graphs that are not limited by instruction block size. Reach-based explicit consumer naming may also have the advantage of requiring less consumer encoding namespace ("reach namespace") since consumer naming is relative to the location of the producer instruction rather than a fixed reference location that may be more frequently farther away from the consumer instruction.

In this regard, FIG. 1 is an exemplary instruction stream 100 fetched from an instruction program stored in computer memory that includes a series of computer instructions I0-I6 to be executed by a processor to illustrate an example of a reach-based explicit consumer communication model of explicit naming of an intended consumer instruction in a producer instruction. A producer instruction is an instruction that when executed by a processor, generates a produced value according to the instruction type and operand(s) of the producer instruction. This produced value may then be provided as an output value to an I/O device, or made available (i.e., communicated) as an input value in a designated operand to another consumer instruction in an instruction stream executed in the processor. Thus, a consumer instruction that uses (i.e., consumes) a produced value generated by executing a producer instruction is dependent on the producer instruction. Dependent instructions are used in both in-order and out-of-order processors. For example, if instruction I2 in the instruction stream 100 in FIG. 1 consumes a produced value generated by execution of instruction I0 in a processor, instruction I2 would be a consumer instruction to the producer instruction I0, thus creating a producer-consumer dependency between instructions I0 and I2. Communications of produced values between dependent instructions can be done implicitly in an implicit communications model using a general purpose register (GPR) namespace as a rendezvous point. However, an implicit communications model can have limitations due to a finite size of GPR namespace and because there is not a direct way for a producer instruction to notify the consumer instructions that its produced value has been produced.

In this regard, as discussed in more detail below, the reach-based explicit consumer communications model disclosed herein for use by processors in communicating produced values from producer instructions to consumer instructions during execution is a "reach"-based explicit consumer communications model. In this model, a processor is configured to process instructions with a supported instruction format that includes the ability of a producer instruction to explicitly name (i.e., encode) an intended dependent consumer instruction(s) within the producer instruction. This explicit consumer naming provides a notification that is recognized during execution by a processor supporting the reach-based explicit consumer communications model to communicate a produced value from a producer instruction to the named target consumer instruction for consumption. In an explicit dataflow communications model, a method is needed to encode the location of the intended consumer instruction in the producer instruction. In examples of the reach-based explicit consumer communications model disclosed herein, the explicit naming of the consumer instruction in a producer instruction is based on encoding a "target distance" value in the producer instruction. The "target distance" value indicates the location of the intended consumer instruction in an instruction stream based on using the location of the producer instruction in the instruction stream as a relative reference point. In other words, the "target distance" value defines the distance that the intended consumer instruction is located from its producer instruction in its instruction stream. This is shown by example in the instruction stream 100 in FIG. 1. For example, if the "reach" (i.e., maximum target distance) is set at four (4) in the instruction set architecture (ISA) of a reach-based explicit dataflow processor configured to process the instruction stream 100, this means that any instruction I0-I6 in the instruction stream 100 is capable of explicitly naming a consumer instruction within four (4) instruction locations of the producer instruction in the instructions stream 100. For example, instruction I0 as a producer instruction can name any of instructions I1-I4 as consumer instructions with a maximum target distance of four (4). Similarly, as shown in FIG. 1, instructions I1 and I2 as producer instructions can name any of instructions I2-I5 and instructions I3-I6, respectively, as consumer instructions with a maximum target distance of four (4). However, for example, instruction I0 cannot directly target instruction I5 in this example, because I5 is located five (5) instruction positions away from instruction I0, beyond the maximum target distance of four (4). The targeted consumer instruction must also be located a distance equal to or less than the maximum target distance according to the ISA to be explicitly named in a producer instruction. However, instruction I0 could indirectly target instruction I5 by naming one of intermediate instructions I1-I4 as a consumer and then that intermediate instruction naming instruction I5 as an ultimate consumer. Otherwise, as discussed in more detail below, intermediate consumer/producer instructions or implicit dataflow communications can be employed.

In this manner, as an example, this reach-based explicit consumer communications model does not require instructions to be grouped in instruction blocks that support a fixed block reference point for explicit naming of consumer instructions, and thus is not limited to a producer instruction explicitly naming a consumer instruction only within its same instruction block. Thus, removing the architectural limitation of instruction blocks in a dataflow processor can allow the dataflow processor to be designed to support explicit data flow communications over larger computation graphs that are not limited by instruction block size. Each producer instruction in a reach-based explicit consumer communications model is capable of having a private set of consumer names, which allows an unlimited number of consumers to be named (i.e., reached) in an instruction stream, and thus a computation graph over the entire instruction stream, if desired. However, the allocated bits in the supported reach namespace will control the maximum target distance that can be encoded in a producer instruction and processed by a compatible processor. The bit size of the reach namespace is a design decision determined by the desired tradeoff between the instruction memory size needed to store a given number of instructions and the reach namespace desired. Regardless, reach-based explicit consumer naming has the advantage of requiring less consumer encoding namespace ("reach namespace") over block-atomic execution models, since consumer naming is relative to the producer instruction rather than a fixed reference that may be more frequently farther away from the consumer instruction.

FIG. 2A illustrates an exemplary reach-based explicit consumer naming instruction format 200 ("instruction format 200") for a producer instruction 202 that includes reach-based explicit consumer namespace for encoding one or more consumer instructions according to an exemplary reach-based explicit naming instruction set architecture (ISA). FIG. 2B illustrates an example of an ADD producer instruction 204 encoded with the instruction format 200 of the producer instruction 202 in FIG. 2A to reach-based explicitly name a consumer. A processor that is compatible with a reach-based explicit consumer communications model and instruction format 200 in FIG. 2A will communicate the produced value resulting from execution of the producer instruction 202 to the named consumer instructions. In this example, as shown in FIG. 2A, the instruction format 200 has an instruction type INST. For example, an instruction type of an addition instruction type is shown as the ADD producer instruction 204 in FIG. 2B. Further, as shown in FIG. 2A, the instruction format 200 also includes an optional operand OP that provides an input operand for the producer instruction 202. For example, the operand in the ADD producer instruction 204 in FIG. 2B is register R1. Note that an operand may not be required if previous producer instructions in an instruction stream targeted the ADD producer instruction 204 as a consumer of its produced values.

As also shown in the example in FIG. 2A, the instruction format 200 also includes a consumer namespace 206 to annotate one or more targeted consumers of the producer instruction 200. In the example in FIG. 2B, two named consumers 208(1), 208(2) are provided that are each identified by a notation pair <+TD, 't'>, wherein "TD" is target distance, and 't' is one of the set of {0, 1, . . . , N, P}. In this example, +TD indicates a relative target distance from the producer instruction 202 in which a consumer instruction for the producer instruction 202 is located in an instruction stream. 't' indicates the operand of the named consumer instruction that the producer instruction 202 is naming for a processor to pass its produced value. For example, a 't' value of '0' means operand 0 of the consumer instruction, '1' means operand '1' of the consumer instruction, 'N' means operand 'N' of the consumer instruction to represent any other number of operands that may be possible in the instruction format 200, and 'P' means predicate of the consumer instruction if the consumer instruction is a predicate instruction. Thus, the interpretation of consumer namespace format <+TD, 't'> is that the produced value from the producer instruction 200 should be delivered to the consumer instruction 'TD' distance positions forward from the producer instruction in the instruction stream and the produced value is used as input 't' to the consumer instruction.

Thus for example, as shown in the ADD producer instruction 204 in FIG. 2B, a first named consumer is provided as <+3:0>, meaning the produced value from execution of the ADD producer instruction 204 is to be communicated as operand 0 to a consumer instruction at a forward distance of three (3) instructions from the producer instruction 204. Also as shown in the ADD producer instruction 204 in FIG. 2B, a second named consumer is provided as <+8:1>, meaning the produced value from execution of the ADD producer instruction 204 is to be communicated as operand 1 to a consumer instruction at a forward distance of eight (8) instructions from the producer instruction. If the maximum target distance is eight (8), three (3) bits can be provided in the instruction format 200 to encode the target distance +TD.

Figure 3A:
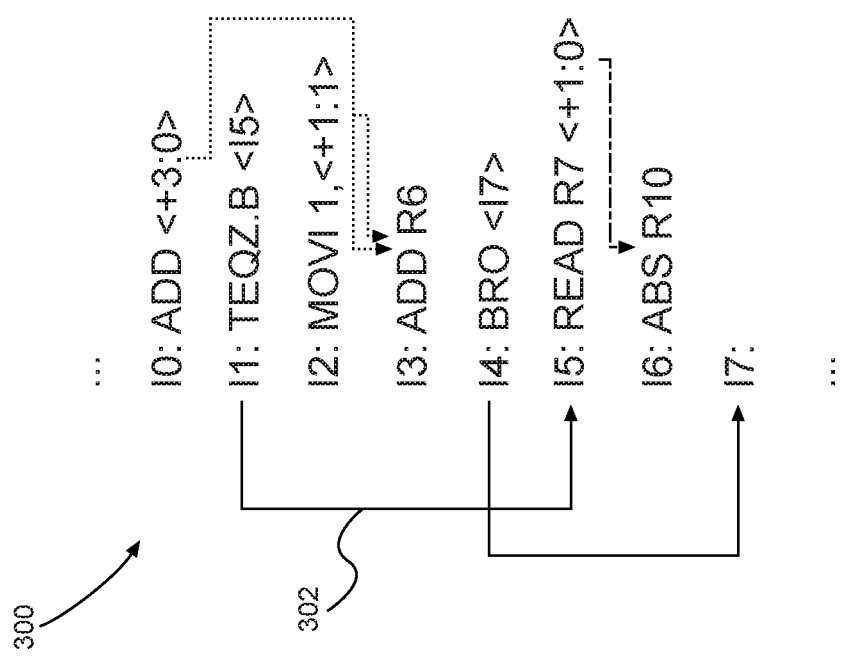
FIG. 3A is an exemplary instruction stream of computer instructions encoded with reach-based explicit consumer naming and configured to be processed by a reach-based explicit dataflow processor, wherein the instruction listing includes a branch instruction creating a write-after-write (WAW) hazard and includes a WAW instruction after the branch instruction to resolve the WAW hazard.

To further illustrate the reach-based explicit consumer communications model, FIG. 3A is provided to illustrate an exemplary instruction stream 300 of computer instructions I0-I6 that are configured to be executed by a reach-based explicit dataflow processor to perform reach-based explicit communication of produced values to named consumer instructions. As shown in FIG. 3A, instruction I0 is an ADD instruction type that includes named consumer instruction at a forward target distance of '3' from the instruction I0 to receive the produced value in operand 0. Thus, the consumer instruction of instruction I0 is instruction I3. Instruction I1, a test if equal 0 instruction (TEQZ.B), is a conditional branch instruction that has a conditional branch location of instruction I5 if the condition is true. Because the conditional branch instruction I1 is located between producer instruction I0 and intended consumer instruction I3, the conditional branch instruction I1 will be executed before consumer instruction I3. The conditional branch instruction I1 in this example is located a distance from producer instruction I0 less than the named consumer target distance value '3.' The third instruction (for a target distance value of '3') following instruction I0 is instruction I3 only if the conditional branch in instruction I1 is evaluated as not true and thus the branch not taken. If the branch is not taken from execution of instruction I1, instruction I2 is executed that names operand 1 of instruction I3 as the consumer of the produced value from instruction I2 such that instruction I3 adds the produced result from instruction I0 and instruction I2 and stores that result in register R6. However, if the branch is taken in conditional branch instruction I1, the third instruction following instruction I0 would be instruction I6, which is a branch taken instruction located in the branch taken flowpath for conditional branch instruction I1. This creates a write-after-write (WAW) hazard if the branch in conditional branch instruction I1 is taken, because the intent of the instruction stream 300 is to have instruction I3 consume the produced result from the execution of instruction I0. This WAW hazard is a result of the reach-based explicit consumer communications model naming an intended consumer instruction using a relative target distance value based on the location of the producer instruction in the instruction stream. If a consumer name was at a relative fixed location in the instruction stream 300, such as the start of an instruction block for example, instruction I0 could specifically name instruction I3 as its consumer to avoid the WAW hazard. However, as previously discussed, reach-based explicit consumer communications models can have the advantages of supporting reach-based explicit dataflow communications over larger computation graphs that are not limited by an instruction block size as well as requiring less reach namespace.

Thus, in this example, to prevent the incorrect delivery of a produced value to the consumer instruction I6 when the branch is taken from execution of the conditional branch instruction I1 creating a WAW hazard, instruction I5 is provided to perform a WAW operation in the branch taken dataflow path 302 from execution of instruction I1 in instruction stream 300 also specifies instruction I6 as its consumer. Instruction I5 is considered a WAW instruction located in the instruction stream 300 between the branch taken instruction I6 and the consumer instruction I3. In this manner, the produced value from instruction I0 is overwritten by the producer instruction I5 if the branch in the conditional branch instruction I1 is not taken to avoid instruction I6 consuming an unintended result from instruction I0. A programmer or compiler producing instructions according to a reach-based explicit consumer communications model can be configured to recognize such a WAW hazard and prevent the incorrect delivery of a produced value to the consumer instruction I6 when the branch is taken from execution of the conditional branch instruction I1 by employing another producer instruction (e.g., instruction I5 in FIG. 3A) in the hazard flowpath to perform a write-after-write (WAW) operation. This additional producer instruction I5 names the unintended consumer instruction (e.g., instruction I6 in FIG. 3A) and the operand (e.g., operand 0) of the producer instruction (e.g., instruction I0 in FIG. 3A) that created the WAW hazard. This has the effect of causing the overwriting of the unintended produced value from being consumed by the unintended consumer instruction.

Figure 3B:
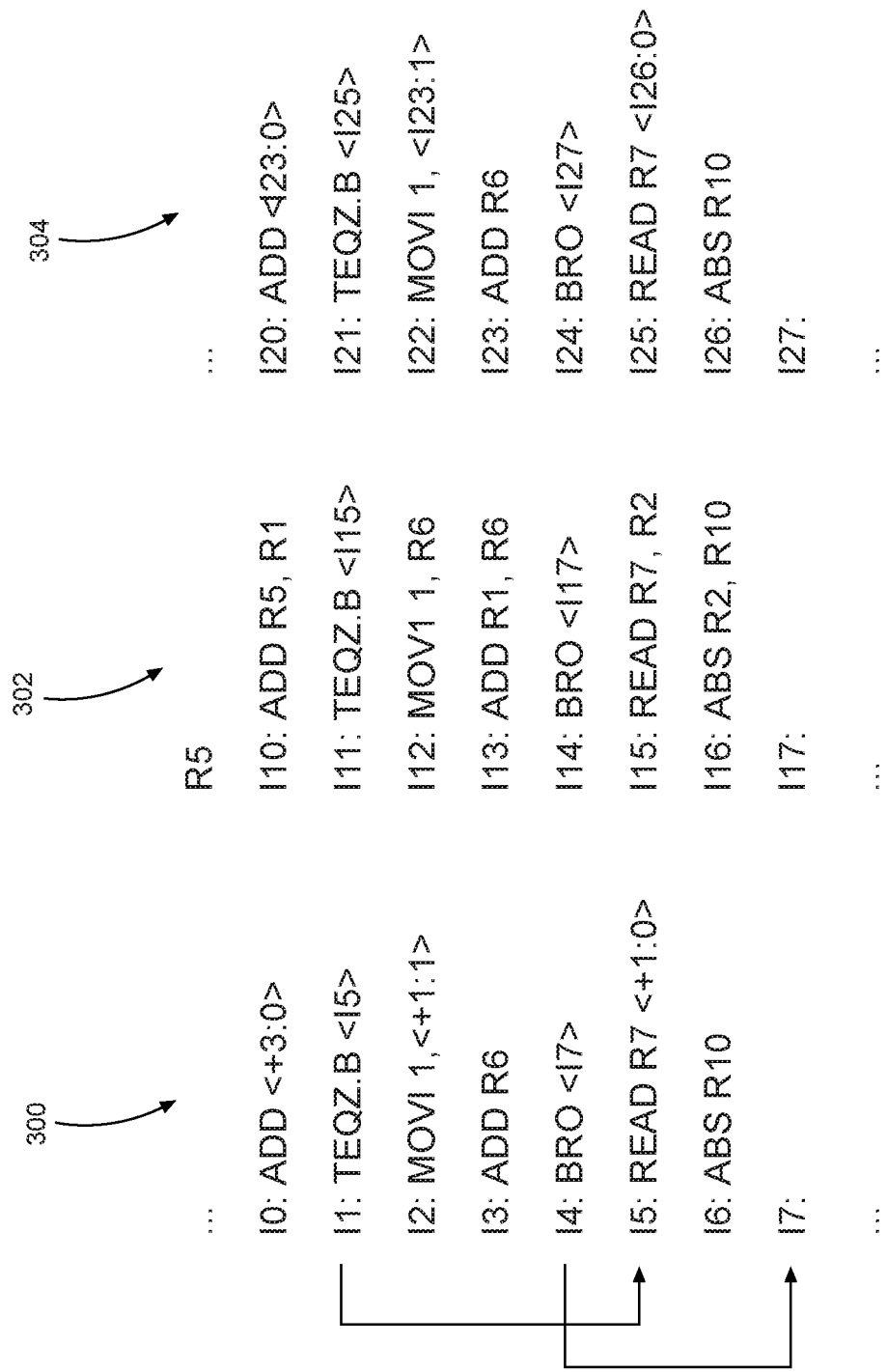
FIG. 3B illustrates the exemplary instruction stream in FIG. 3A as compared to other instruction streams allowing a processor to perform the same operations based on an implicit consumer naming, and explicit consumer naming in an instruction block architecture.

FIG. 3B illustrates the exemplary instruction stream 300 in FIG. 3A as compared to two other similar instruction streams 302, 304 for comparison purposes. Instruction stream 302 is encoded using an implicit consumer communications model. Instruction stream 304 is encoded using an explicit consumer communications model using an encoded location based on the start of an instruction block, respectively. Instruction stream 302 based on an implicit consumer communications model includes instructions I10-I16. These instructions I10-I16 have the same instruction type as instructions I0-I6 in instruction stream 300 and are encoded to cause a processor to generate the same results, but the instruction stream 302 use register names to perform implicit consumer naming in producer instructions. Instruction stream 304 includes instructions I20-I26. These instructions I20-I26 have the same instruction type as instructions I0-I6 in instruction stream 300 and are encoded to cause a processor to generate the same results, but the instruction stream 304 uses explicit naming based on the absolute instruction locations relative to the start of an instruction block to name consumers in producer instructions.

FIG. 4 is a schematic diagram of a processor-based system 400 that includes an exemplary reach-based explicit dataflow processor 402 ("processor 402") configured to support a reach-based explicit consumer communications model. The processor 402 includes an instruction processing circuit 404 that is configured to process instructions to be executed. The processor 402 may be an in-order or an out-of-order processor (OoP) as examples. Instructions 406 are fetched by an instruction fetch circuit 408 provided in the instruction processing circuit 404 from an instruction memory 410. The instruction memory 410 may be provided in or as part of a system memory in the processor-based system 400 as an example. An instruction cache 412 may also be provided in the processor 402 to cache the instructions 406 fetched from the instruction memory 410 to reduce latency in the instruction fetch circuit 408. The instruction fetch circuit 408 in this example is configured to provide the instructions 406 as fetched instructions 406F into one or more instruction pipelines $I_0$-$I_N$ as an instruction stream 411 in the instruction processing circuit 404 to be pre-processed, before the fetched instructions 406F reach an execution circuit 414 to be executed. The fetched instructions 406F in the instruction stream 411 include producer instructions and consumer instructions that consume produced values as a result of the instruction processing circuit 404 executing producer instructions. The instruction pipelines $I_0$-$I_N$ are provided across different processing circuits or stages of the instruction processing circuit 404 to pre-process and process the fetched instructions 406F in a series of steps that can be performed concurrently to increase throughput prior to execution of the fetched instructions 406F in the execution circuit 414.

A control flow prediction circuit 416 (e.g., a branch prediction circuit) is also provided in the instruction processing circuit 404 in the processor 402 in FIG. 4 to speculate or predict a target address for a control flow fetched instruction 406F, such as a conditional branch instruction. The prediction of the target address by the control flow prediction circuit 416 is used by the instruction fetch circuit 408 to determine the next fetched instructions 406F to fetch based on the predicted target address. The instruction processing circuit 404 also includes an instruction decode circuit 418 configured to decode the fetched instructions 406F fetched by the instruction fetch circuit 408 into decoded instructions 406D to determine the instruction type and actions required, which may also be used to determine in which instruction pipeline $I_0$-$I_N$ the decoded instructions 406D should be placed. The decoded instructions 406D are then placed in one or more of the instruction pipelines $I_0$-$I_N$ and are next provided to a rename circuit 420 in the instruction processing circuit 404. The rename circuit 420 is configured to determine if any register names in the decoded instructions 406D need to be renamed to break any register dependencies that would prevent parallel or out-of-order processing. The rename circuit 420 is configured to call upon a register map table (RMT) 422 to rename a logical source register operand and/or write a destination register operand of a decoded instruction 406D to available physical registers 424(1)-424(X) ($P_0$, $P_1$, . . . , $P_X$) in a physical register file (PRF) 426. The register map table (RMT) 422 contains a plurality of mapping entries each mapped to (i.e., associated with) a respective logical register $R_0$-$R_P$. The mapping entries are configured to store information in the form of an address pointer to point to a physical register 424(1)-424(X) in the physical register file (PRF) 426. Each physical register 424(1)-424(X)) in the physical register file (PRF) 424 contains a data entry configured to store data for the source and/or destination register operand of a decoded instruction 406D.

The instruction processing circuit 404 in the processor 402 in FIG. 4 also includes a register access circuit 428 prior to a dispatch circuit 430. The register access circuit 428 is configured to access a physical register 424(1)-424(X) in the physical register file (PRF) 426 based on a mapping entry mapped to a logical register $R_0$-$R_P$ in the register map table (RMT) 422 of a source register operand of a decoded instruction 405D to retrieve a produced value from an executed instruction 406E in the execution circuit 414. The register access circuit 428 is also configured to provide the retrieved produced value from an executed decoded instruction 406E as the source register operand of a decoded instruction 406D to be executed. Also, in the instruction processing circuit 404, the dispatch circuit 430 is provided in the instruction pipeline $I_0$-$I_N$ and is configured to dispatch a decoded instruction 406D to the execution circuit 414 to be executed when all source register operands for the decoded instruction 406D are available. For example, the dispatch circuit 430 is responsible for making sure that the necessary values for operands of a decoded consumer instruction 406D are available before dispatching the decoded consumer instruction 406D to the execution circuit 414 for execution. The operands of a decoded instruction 406D can include immediate values, values stored in memory, and produced values from other decoded instructions 406D that would be considered producer instructions to the consumer instruction.

The execution circuit 414 is configured to execute decoded instructions 406D received from the dispatch circuit 430. Decoded instructions 406D that generate produced values to be consumed by a consumer instruction in the instruction processing circuit 404 are considered producer instructions. As discussed above, in the reach-based explicit consumer communications model supported by the processor 402 in FIG. 4, a decoded producer instruction 406D can name a consumer instruction, and in such case would include an explicit consumer name encoded by consumer target distance value TD+ representing a relative instruction distance in the instruction stream 411 from the decoded producer instruction 406D, and an associated consumer operand value 't.' The execution circuit 414 is configured to determine if an executed producer instruction 406D includes an explicit consumer name. If so, the write circuit 432 in the instruction processing circuit 404 is configured to write the produced value generated by executed producer instruction 406D to the operand of the consumer instruction 406D in the instruction processing circuit 404 identified as being located a distance away from the producer instruction 406D in the instruction stream 411 by the consumer target distance value TD+ of the executed producer instruction 406D. In this example, the instruction processing circuit 404 includes a produced value storage circuit 434 that is configured to receive and store produced values from the write circuit 432 that were generated by the execution circuit 414 by execution of a producer instruction 406D naming a consumer instruction 406D. The produced value storage circuit 434 is configured to make the produced result available to the dispatch circuit 430 so that the produced value can be provided and made available for a named consumer instruction 406D to be executed.

Note that a producer instruction 406D can also include more than one explicitly named consumer instruction 406D, in which case the write circuit 432 can store the produced result associated with more than one consumer instruction in the produced value storage circuit 434 to be provided to the dispatch circuit 430. Also note that as discussed above, the reach-based explicit consumer communications model supported by the processor 402 in FIG. 4 supports providing produced results from an executed producer instruction 406D as a predicate to a conditional consumer instruction 406D, such as a conditional branch instruction. In this example, the producer instruction 406D can include an explicit consumer name of the intended conditional consumer instruction 406D that includes the consumer target distance value TD+ and a consumer predicate value as the operand value 't.' The write circuit 432 can store the produced result as a predicate associated with the named conditional consumer instruction 406D in the produced value storage circuit 434 to be provided to the dispatch circuit 430 when ready to dispatch the conditional consumer instruction 406D to be executed.

If a decoded instruction 406D that is executed does not explicitly name a consumer instruction 406D in the instruction stream 411, the write circuit 432 can write a produced result to a physical register $P_0$-$P_X$ in the physical register file 426 and/or memory called for in the decoded instruction 406D. If the desired consumer instruction 406D for a producer instruction 406D is located farther away from the producer instruction 406D in the instruction stream 411 than the maximum consumer target distance value that can be encoded in the producer instruction 406D, the write circuit can write a produced result to a physical register $P_0$-$P_X$ in the physical register file 426 to provide an implicit communication of the produced result to a consumer instruction 406D waiting to be dispatched to the execution circuit 414 for execution.

Figure 5:
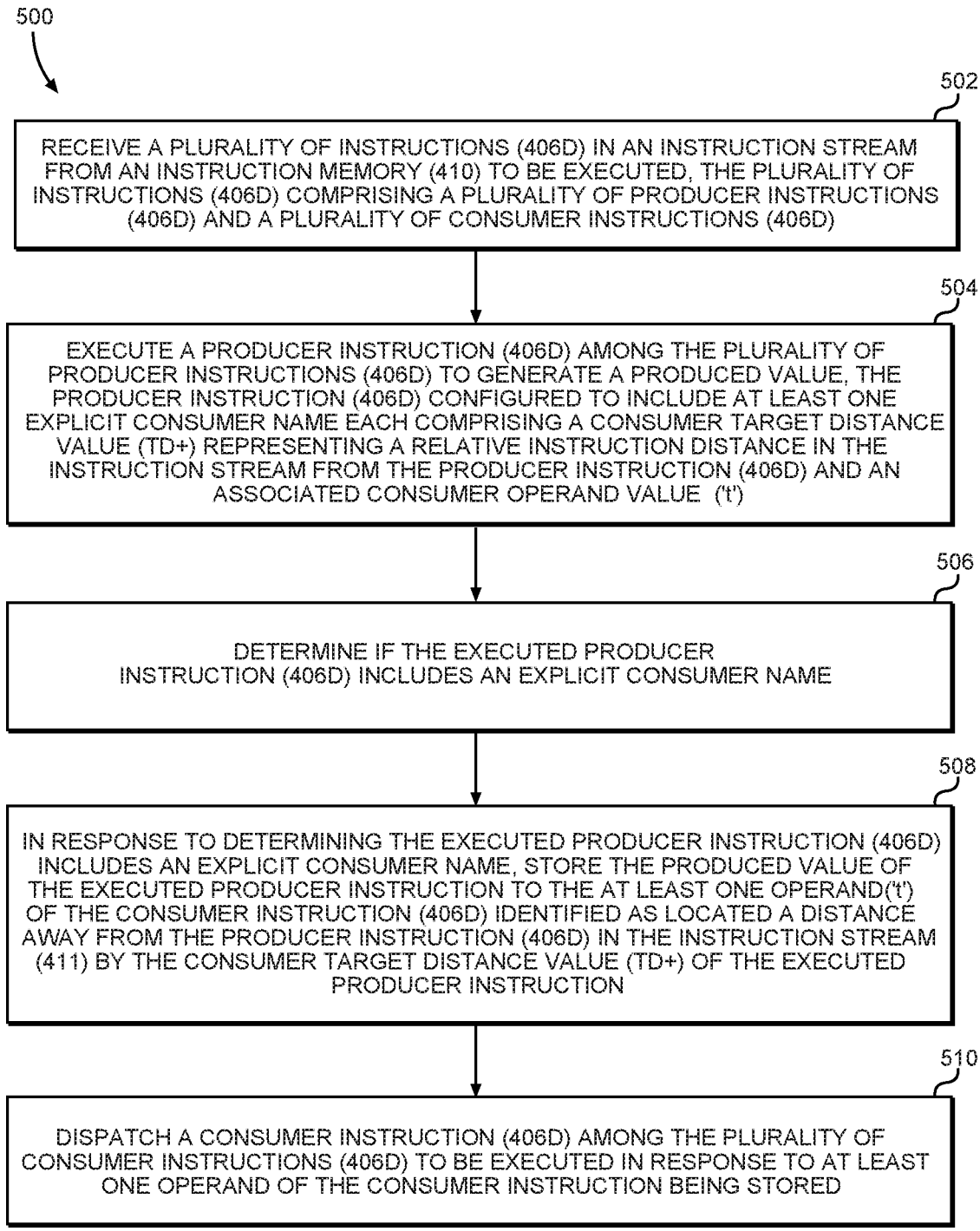
FIG. 5 is a flowchart illustrating an exemplary process of a reach-based explicit dataflow processor, such as the reach-based explicit dataflow processor in FIG. 4, communicating produced values from executed producer instructions to be consumed by consumer instructions identified by reach-based explicit consumer naming in the executed producer instruction.

FIG. 5 is a flowchart illustrating an exemplary process 500 of a reach-based explicit dataflow processor, such as the reach-based explicit dataflow processor 402 in FIG. 4, communicating produced values from executed producer instructions to be consumed by consumer instructions identified by reach-based explicit consumer instruction naming in the executed producer instructions. The process 500 in FIG. 5 will be discussed in conjunction with operations of the processor 402 in FIG. 4 as an example.

In this regard, the instruction processing circuit 404 receives a plurality of instructions 406 in the instruction stream 411 from the instruction memory 410 to be executed (block 502 in FIG. 5). The instruction fetch circuit 408 in the processor 402 is configured to fetch the instructions 406 from the instruction memory 410 and/or the instruction cache 412 if the instructions 406 are first fetched or prefetched into the instruction cache 412. The instructions can include a plurality of producer instructions and a plurality of consumer instructions. The execution circuit 414 executes a producer instruction 406D for the consumer instruction 406D to generate a produced value, the producer instruction configured to include at least one explicit consumer name each comprising a consumer target distance value representing a relative instruction distance in the instruction stream from the producer instruction and an associated consumer operand value (block 504 in FIG. 5). The execution circuit 414 determines if the executed producer instruction 406D includes an explicit consumer name (block 506 in FIG. 5). In response to determining the executed producer instruction 406D includes an explicit consumer name, the write circuit 432 stores the produced value of the executed producer instruction 406D in the produced value storage circuit 434 to the at least one operand CO of the consumer instruction 406D identified as being located a distance away from the producer instruction 406D in the instruction stream 411 by the consumer target distance value (TD+) of the executed producer instruction (block 508 in FIG. 5). The dispatch circuit 430 dispatches the consumer instruction 406D to the execution circuit 414 to be executed in response to the at least one operand 't' of the consumer instruction 406D being available in the produced value storage circuit 434 (block 510 in FIG. 5).

As discussed above in the example instruction stream 300 in FIG. 3A, reach-based explicit consumer naming can create WAW hazards when conditional branch instructions are located between a producer instruction and its intended target instruction such that the relative target distance from the producer instruction can change based on whether the branch is taken or not taken. As discussed above in FIG. 3A, one way to resolve this hazard is to provide a producer instruction in the branch taken path, for example, if the intended named consumer in an earlier producer instruction is in the not taken path, to write or overwrite the produced results. An example of this was shown as the WAW instruction I5 in FIG. 3A. However, there are other ways to construct instruction streams that can resolve WAW hazards.

In this regard, FIG. 6A is an exemplary instruction stream 600 of computer instructions I0-I11 encoded with reach-based explicit consumer instruction naming and configured to be processed by a reach-based dataflow processor, such as the processor 402 in FIG. 4. In this example instruction stream 600, a WAW hazard is present due to a conditional branch instruction I6. Instruction I5 creates a WAW hazard with producer instruction I3 if the condition in conditional branch instruction I6 is resolved to branch taken. Producer instruction I3 names instruction I5 as a consumer, wherein instruction I5 then names a consumer instruction with a target distance of '+2'. Instruction I6 is a conditional branch instruction following instruction I5. Thus, if the branch is taken in conditional branch instruction I6, the produced value from execution of instruction I5, which is based on consuming a produced value from instruction I3, is communicated to consumer instruction I9 and not intended consumer instruction I7. Thus, this WAW hazard will incorrectly provide the produced value from instruction I5 to consumer instruction I9 instead of the instruction I7, which is not the behavior intended by the programmer in this example.

To resolve this WAW hazard in the instruction stream 600 in FIG. 6A, FIG. 6B is an alternative exemplary instruction stream 602 with instructions I0-I12 to carry out the same and intended operations of the instruction stream 600 in FIG. 6A when executed by a reach-based explicit dataflow processor, such as processor 402 in FIG. 4. Instructions I0-I4 are the same between the instruction stream 602 in FIG. 6B and the instruction stream 600 in FIG. 6A. Also, instructions I7-I12 in the instruction stream 602 in FIG. 6B are the same instruction types with the same intended operands and consumed values as instructions I6-I11 in the instruction stream 600 in FIG. 6A. To resolve the WAW hazard in the instruction stream 600 in FIG. 6A, the instruction stream 602 in FIG. 6B includes an additional conditional branch instruction I5 between what is instruction I4 and I6 in the instruction stream 600 in FIG. 6A. Also, the instruction I6 in FIG. 6B, which was based on instruction I5 in the instruction stream 600 in FIG. 6A, is changed to a predicate instruction I6 (a subtraction—SUB). The predicate instruction I6 is located between the producer instruction I3 and the conditional branch instruction I7. A conditional branch instruction I5 as a predicate producing instruction that has the same predicate as conditional branch instruction I7 is inserted before the prediction instruction I6 so that predicate instruction I6 only generates a predicate produced value when the condition of inserted conditional branch instruction I5 is resolved as not taken. The conditional branch instruction I5 as a conditional branch instruction is inserted to be located a target distance from a named consumer instruction in the producer instruction I3. In this manner, the instructions in the instruction stream 602 in FIG. 6A are arranged for the produced value from producer instruction I2 to only be valid for the not taken flowpath of conditional branch instruction I7 to avoid the WAW hazard that was created by conditional branch instruction I7.

FIG. 7 is another exemplary instruction stream 700 of computer instructions encoded with reach-based explicit consumer instruction naming and configured to be processed by a reach-based dataflow processor, wherein a WAW hazard is resolved. As discussed below, the WAW hazard is resolved by providing instructions and encoding so that a produced value is not communicated to an unintended consumer instruction if a branch from a resolved conditional branch instruction is taken. In this regard, as shown in FIG. 7, instruction I2 is a producer instruction that names instruction I5 as a consumer instruction based on the consumer naming of <+3, 0> indicating a target distance of '3' from instruction I2. However, instruction I4 between the producer instruction I2 and the intended consumer instruction I5 is a conditional branch instruction. In this example, the WAW hazard is resolved by providing an encoding mechanism to support an invalidate operand to be included in a conditional branch instruction. The invalidate operand is included in a special invalidate conditional branch instruction I4 that is configured to instruct a processor to invalidate the produced value generated from execution of producer instruction I2 if the conditional branch instruction I4 is resolved as branch taken. In this manner, the produced value from instruction I3 is not communicated to an unintended consumer instruction in the taken dataflow path of the instruction stream 300 when the branch is taken from conditional branch instruction I4. The special invalidate conditional branch instruction can be noted by a unique or variation of an opcode of a like-kind conditional branch instruction, for example.

FIG. 8 is a block diagram of an exemplary processor-based system 800 that includes a reach-based explicit dataflow processor 802 ("processor 802") configured to support execution of producer instructions encoded with reach-based explicit naming of consumer instructions intended to consume the values produced by the producer instructions. For example, the processor 802 in FIG. 8 could be the processor 402 in FIG. 4. The processor-based system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 804 for temporary, fast access memory storage of instructions and an instruction processing circuit 810. Fetched or prefetched instructions from a memory, such as from the system memory 808 over a system bus 806, are stored in the instruction cache 804. The instruction processing circuit 810 is configured to process instructions fetched into the instruction cache 804 and process the instructions for execution. The instruction processing circuit 810 is compatible with a reach-based explicit consumer communications model and instruction encoding such that the instruction processing circuit 810 supports execution producer instructions encoded with reach-based explicit naming of consumer instructions such that these produced values are communicated as input values to the named consumer instructions for their execution.

The processor 802 and the system memory 808 are coupled to the system bus 806 and can intercouple peripheral devices included in the processor-based system 800. As is well known, the processor 802 communicates with these other devices by exchanging address, control, and data information over the system bus 806. For example, the processor 802 can communicate bus transaction requests to a memory controller 812 in the system memory 808 as an example of a slave device. Although not illustrated in FIG. 8, multiple system buses 806 could be provided, wherein each system bus constitutes a different fabric. In this example, the memory controller 812 is configured to provide memory access requests to a memory array 814 in the system memory 808. The memory array is comprised of an array of storage bit cells for storing data. The system memory 808 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 806. As illustrated in FIG. 8, these devices can include the system memory 808, one or more input device(s) 816, one or more output device(s) 818, a modem 824, and one or more display controllers 820, as examples. The input device(s) 816 can include any type of input device, including but not limited to input keys, switches, voice processors, etc. The output device(s) 818 can include any type of output device, including but not limited to audio, video, other visual indicators, etc. The modem 824 can be any device configured to allow exchange of data to and from a network 826. The network 826 can be any type of network, including but not limited to a wired or wireless network, a private or public network, a local area network (LAN), a wireless local area network (WLAN), a wide area network (WAN), a BLUETOOTH™ network, and the Internet. The modem 824 can be configured to support any type of communications protocol desired. The processor 802 may also be configured to access the display controller(s) 820 over the system bus 806 to control information sent to one or more displays 822. The display(s) 822 can include any type of display, including but not limited to a cathode ray tube (CRT), a liquid crystal display (LCD), a plasma display, etc.

The processor-based system 800 in FIG. 8 may include a set of instructions 828 that may be encoded with the reach-based explicit consumer naming model to be executed by the processor 802 for any application desired according to the instructions. The instructions 828 may be stored in the system memory 808, processor 802, and/or instruction cache 804 as examples of non-transitory computer-readable medium 830. The instructions 828 may also reside, completely or at least partially, within the system memory 808 and/or within the processor 802 during their execution. The instructions 828 may further be transmitted or received over the network 826 via the modem 824, such that the network 826 includes the computer-readable medium 830.

While the computer-readable medium 830 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A non-transitory computer-readable medium having stored thereon an instruction program comprising a plurality of computer executable instructions for execution by a processor, the plurality of computer executable instructions comprising:
   a producer instruction comprising an instruction type and an explicit consumer name comprising a consumer target distance value representing a relative instruction distance in an instruction stream from the producer instruction and an associated consumer operand value identifying an operand to be written by the producer instruction;
   a consumer instruction comprising an instruction type and an operand, the consumer instruction located an instruction distance away from the producer instruction in the instruction program by the consumer target distance value of the producer instruction, and the associated consumer operand value of the producer instruction mapped to the operand of the consumer instruction; and
   the plurality of computer executable instructions further comprising:
      a conditional branch instruction comprising a predicate and a conditional branch location, the conditional branch instruction located between the producer instruction and the consumer instruction in the instruction program, the conditional branch instruction located in the instruction program a distance from the producer instruction less than the consumer target distance value of the producer instruction;
      a predicate instruction comprising the predicate of the conditional branch instruction, the predicate instruction located between the producer instruction and the conditional branch instruction in the instruction program;
      a predicate producer instruction located between the predicate instruction and the conditional branch instruction in the instruction program, the predicate producer instruction comprising the predicate of the conditional branch instruction and a second explicit consumer name comprising a second consumer target distance value representing a second relative instruction distance in the instruction program from the predicate producer instruction and a second associated consumer operand value, the predicate producer instruction located a distance of the second consumer target distance value from the consumer instruction in the instruction program; and
      the predicate producer instruction configured to only cause the processor to execute the predicate producer instruction to generate a predicate produced value for the operand of the consumer instruction in response to the predicate of the predicate instruction resolving to a not taken state of the conditional branch instruction.

2. The non-transitory computer-readable medium of claim 1, the plurality of computer executable instructions further comprising:
   a branch taken instruction comprising an evaluation operand, the branch taken instruction located in the instruction program at the conditional branch location in the conditional branch instruction; and
   a write-after-write (WAW) instruction located in the instruction program between the branch taken instruction and the consumer instruction, the WAW instruction configured to produce the evaluation operand of the branch taken instruction.

3. The non-transitory computer-readable medium of claim 1, wherein the plurality of computer executable instructions further comprises:
   an invalidate conditional branch instruction comprising a second predicate, and a second conditional branch location, the invalidate conditional branch instruction located between the producer instruction and the consumer instruction in the instruction program, the invalidate conditional branch instruction located in the instruction program a distance from the producer instruction less than the consumer target distance value of the producer instruction; and
   the invalidate conditional branch instruction configured to cause the processor executing the invalidate conditional branch instruction to invalidate a produced value generated by execution of the producer instruction, in response to the second predicate of the invalidate conditional branch instruction resolving to a taken state.

* * * * *